United States Patent
Norimatsu

(10) Patent No.: US 11,575,604 B2
(45) Date of Patent: Feb. 7, 2023

(54) SERVER APPARATUS, EDGE EQUIPMENT, PROCESS PATTERN SPECIFYING METHOD, AND CONTROL PROGRAM

(71) Applicant: NEC Corporation, Tokyo (JP)

(72) Inventor: Sayumi Norimatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 155 days.

(21) Appl. No.: 17/193,119

(22) Filed: Mar. 5, 2021

(65) Prior Publication Data

US 2021/0281513 A1 Sep. 9, 2021

(30) Foreign Application Priority Data

Mar. 9, 2020 (JP) .............................. JP2020-039641

(51) Int. Cl.
*H04L 12/743* (2013.01)
*H04L 45/7453* (2022.01)
*G06F 16/22* (2019.01)
*H04L 67/55* (2022.01)

(52) U.S. Cl.
CPC ...... *H04L 45/7453* (2013.01); *G06F 16/2255* (2019.01); *H04L 67/55* (2022.05)

(58) Field of Classification Search
CPC .................. H04L 67/55; H04L 45/7453; G04F 16/2255
USPC .......................................................... 370/392
See application file for complete search history.

(56) References Cited

U.S. PATENT DOCUMENTS

| 2008/0201772 | A1* | 8/2008 | Mondaeev | H04L 47/12 726/13 |
| 2009/0180133 | A1* | 7/2009 | Yamamoto | G06F 3/1285 358/1.15 |
| 2015/0127565 | A1* | 5/2015 | Chevalier | G06Q 50/01 705/319 |
| 2017/0034285 | A1 | 2/2017 | Bhandari et al. | |
| 2017/0052731 | A1* | 2/2017 | Levy | G06F 16/285 |

FOREIGN PATENT DOCUMENTS

| CN | 109167840 A | 1/2019 |
| JP | 2008-011448 A | 1/2008 |
| JP | 2008-102795 A | 5/2008 |
| JP | 2010-531086 A | 9/2010 |
| JP | 2013-009046 | 1/2013 |
| JP | 2013-503584 | 1/2013 |

(Continued)

OTHER PUBLICATIONS

Japanese Office Action for JP Application No. 2020-039641 dated May 18, 2021 with English Translation.

(Continued)

*Primary Examiner* — Christopher M Crutchfield
*Assistant Examiner* — Jean F Voltaire
(74) *Attorney, Agent, or Firm* — Sughrue Mion, PLLC

(57) ABSTRACT

In a server 10, a communication unit 12 receives a signal including processed data and a Bloom filter in accordance with a process pattern executed on the processed data transmitted from an edge equipment 20-2 directly connected to the server 10. A process pattern specifying unit 13 specifies a process pattern executed on the processed data received by the communication unit 12 based on the "process pattern list" and the Bloom filter received in the communication unit 12.

9 Claims, 14 Drawing Sheets

(56) References Cited

FOREIGN PATENT DOCUMENTS

| JP | 2018-132943 A | 8/2018 |
| JP | 2019-086883 | 6/2019 |

OTHER PUBLICATIONS

Yo Nishiyama et at, "Design of Routing-based Packet Forwarding aver an LTE Core Network", IEICE Technical Report, IN2015-37, Japan, The Institute of Electronics, Information and Communication Engineers, Jul. 9, 2015, vol. 115 No. 140, pp. 85-90.

* cited by examiner

| NUMBER | PROCESS PATTERN |
|---|---|
| (1) | A → B → C |
| (2) | A → B → D |
| (3) | A → E → C |
| (4) | B → E → C |
| (5) | B → D → E |

Fig. 6

| PROGRAM | HASH VALUE 1 | HASH VALUE 2 |
|---|---|---|
| A | 6 | 2 |
| B | 4 | 3 |
| C | 0 | 7 |
| D | 2 | 5 |
| E | 3 | 6 |

Fig. 8

| NUMBER | PROCESS PATTERN | \multicolumn{8}{c}{BLOOM FILTER} | SCHEMA |

| NUMBER | PROCESS PATTERN | 0 | 1 | 2 | 3 | 4 | 5 | 6 | 7 | SCHEMA |
|---|---|---|---|---|---|---|---|---|---|---|
| (1) | A→B→C | 1 | 0 | 1 | 1 | 1 | 0 | 1 | 1 | |
| (2) | A→B→D | 0 | 0 | 1 | 1 | 1 | 1 | 1 | 0 | |
| (3) | A→E→C | 1 | 0 | 1 | 1 | 0 | 0 | 1 | 1 | |
| (4) | B→E→C | 1 | 0 | 0 | 1 | 1 | 0 | 1 | 1 | |
| (5) | B→D→E | 0 | 0 | 1 | 1 | 1 | 1 | 1 | 0 | |

Fig. 9

| PROGRAM | OUTPUT DATA SCHEMA | PROGRAM | OUTPUT DATA SCHEMA |
|---|---|---|---|
| A | ```
{
  "properties": {
    "X": {
      "type": "integer"
    },
    "Y": {
      "type": "string"
    }
  }
}
``` | D | ```
{
  "properties": {
    "XXX": {
      "type": "integer"
    },
    "Y": {
      "type": "string"
    }
  }
}
``` |
| B | ```
{
  "properties": {
    "XX": {
      "type": "string"
    },
    "YY": {
      "type": "integer"
    }
  }
}
``` | E | ```
{
  "properties": {
    "X": {
      "type": "integer"
    },
    "Y": {
      "type": "string"
    }
  }
}
``` |
| C | ```
{
  "properties": {
    "X": {
      "type": "string"
    }
  }
}
``` | | |

| NUMBER | PROCESS PATTERN | BLOOM FILTER | | | | | | | | SCHEMA |
|---|---|---|---|---|---|---|---|---|---|---|
| | | 0 | 1 | 2 | 3 | 4 | 5 | 6 | 7 | |
| (1) | A→B→C | 1 | 0 | 1 | 1 | 1 | 0 | 1 | 1 | { "properties": { "XXX": { "type": "integer" }, "y": { "type": "string" } } } |
| (2) | A→B→D | 0 | 0 | 1 | 1 | 1 | 1 | 1 | 0 | |
| (3) | A→E→C | 1 | 0 | 1 | 1 | 0 | 0 | 1 | 1 | |
| (4) | B→E→C | 1 | 0 | 0 | 1 | 1 | 0 | 1 | 1 | { "properties": { "X": { "type": "integer" }, "y": { "type": "string" } } } |
| (5) | B→D→E | 0 | 0 | 1 | 1 | 1 | 1 | 1 | 0 | |

SERVER APPARATUS, EDGE EQUIPMENT, PROCESS PATTERN SPECIFYING METHOD, AND CONTROL PROGRAM

INCORPORATION BY REFERENCE

This application is based upon and claims the benefit of priority from Japanese patent application No. 2020-039641, filed on Mar. 9, 2020, the disclosure of which is incorporated herein in its entirety by reference.

TECHNICAL FIELD

The present disclosure relates to a server apparatus, an edge equipment, a process pattern specifying method, and a control program.

BACKGROUND ART

A system for collecting data obtained in a device such as a sensor or a camera in a server has been proposed (e.g., Japanese Unexamined Patent Application Publication No. 2018-132943). In the technique disclosed in Japanese Unexamined Patent Application Publication No. 2018-132943, a Bloom filter is used to aggregate data.

Incidentally, in order to reduce a communication cost and a processing cost when data is secondarily used, it may be possible to perform processing (e.g., conversion, aggregation or the like) on data in each of a plurality of pieces of edge equipment hierarchized between a device and a server. In this case, it is possible that the processed data may not be efficiently used if there is no information regarding what pattern of processing (i.e., the type of the processing and the order of the processing) has been executed on the processed data that the server receives.

In the technique disclosed in Japanese Unexamined Patent Application Publication No. 2018-132943, however, it is possible that the process pattern executed on the processed data may not be specified.

SUMMARY

An object of the present disclosure is to provide a server apparatus, an edge equipment, a process pattern specifying method, and a control program capable of specifying a process pattern executed on a processed data.

A server apparatus according to a first aspect is a server apparatus included in an information collection system that collects data in the server apparatus from each of a plurality of devices via a plurality of pieces of edge equipment that are hierarchized, the server apparatus including:

a storing unit configured to store a process pattern list, the process pattern list holding a plurality of process patterns associated with management Bloom filters in accordance with the respective process patterns, each of the process patterns corresponding to an execution sequence of processing programs executed in one or more pieces of edge equipment on a route that includes the one or more pieces of edge equipment and reaches the server apparatus, and the management Bloom filter being a Bloom filter formed based on a hash value calculated using a hash function group including one or more hash functions for each processing program included in a corresponding process pattern;

a communication unit configured to receive processed data and a Bloom filter in accordance with the process pattern executed on the processed data transmitted from one of the pieces of edge equipment directly connected to the server apparatus; and a process pattern specifying unit configured to specify the process pattern executed on the processed data based on the process pattern list and the received Bloom filter.

An edge equipment according to a second aspect is an that is included in an information collection system for collecting data in a server apparatus via a plurality of pieces of edge equipment that are hierarchized from a device and transmits processed data obtained by performing processing on data received from the edge equipment in a lower layer to the server apparatus or the edge equipment in a higher layer, the edge equipment including:

a communication unit configured to receive a first Bloom filter along with the data from the edge equipment in the lower layer, the first Bloom filter being a Bloom filter formed based on a hash value calculated using a processing program executed on data in the edge equipment in the lower layer and a hash function group including one or more hash functions; and a forming unit configured to form a second Bloom filter based on a hash value calculated using a processing program executed on the received data in the edge equipment and the hash function group and form a third Bloom filter by calculating a logical sum of the formed second Bloom filter and the received first Bloom filter, in which the communication unit transmits the formed third Bloom filter to the server apparatus or the edge equipment in the higher layer along with the processed data.

A process pattern specifying method according to a third aspect is a process pattern specifying method by a server apparatus included in an information collection system that collects data in the server apparatus from each of a plurality of devices via a plurality of pieces of edge equipment that are hierarchized, in which the server apparatus includes a storing unit configured to store a process pattern list, the process pattern list holding a plurality of process patterns associated with management Bloom filters in accordance with the respective process patterns, each of the process patterns corresponding to an execution sequence of processing programs executed in one or more pieces of edge equipment on a route that includes the one or more pieces of edge equipment and reaches the server apparatus, and the management Bloom filter being a Bloom filter formed based on a hash value calculated using a hash function group including one or more hash functions for each processing program included in a corresponding process pattern, and the process pattern specifying method includes:

receiving processed data and a Bloom filter in accordance with the process pattern executed on the processed data transmitted from one of the pieces of edge equipment directly connected to the server apparatus; and specifying the process pattern executed on the processed data based on the process pattern list and the received Bloom filter.

A control program according to a fourth aspect is a control program for causing a server apparatus included in an information collection system that collects data in the server apparatus from each of a plurality of devices via a plurality of pieces of edge equipment that are hierarchized to execute processing, in which the server apparatus includes a storing unit configured to store a process pattern list, the process pattern list holding a plurality of process patterns associated with management Bloom filters in accordance with the respective process patterns, each of the process patterns corresponding to an execution sequence of processing programs executed in one or more pieces of edge equipment on a route that includes the one or more pieces of edge equipment and reaches the server apparatus, and the management Bloom filter being a Bloom filter formed based on a hash value calculated using a hash function group including one or more hash functions for each processing program included in a corresponding process pattern, and the processing for causing the server apparatus to execute the processing includes:

receiving processed data and a Bloom filter in accordance with the process pattern executed on the processed data transmitted from one of the pieces of edge equipment directly connected to the server apparatus; and specifying the process pattern executed on the processed data based on the process pattern list and the received Bloom filter.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 6 is a diagram showing one example of a pattern candidate list according to the third example embodiment;

FIG. 8 is a diagram for explaining calculation of hash values;

FIG. 9 is a diagram for explaining formation of Bloom filters;

FIG. 10 is a diagram showing one example of a schema candidate table stored in a schema candidate storing unit;

FIG. 11 is a diagram showing one example of a process pattern list;

EMBODIMENTS

Hereinafter, with reference to the drawings, example embodiments will be described. In the example embodiments, the same or similar elements are denoted by the same symbols and the overlapping descriptions will be omitted.

First Example Embodiment

<Outline of Information Collection System>

Figure 1:
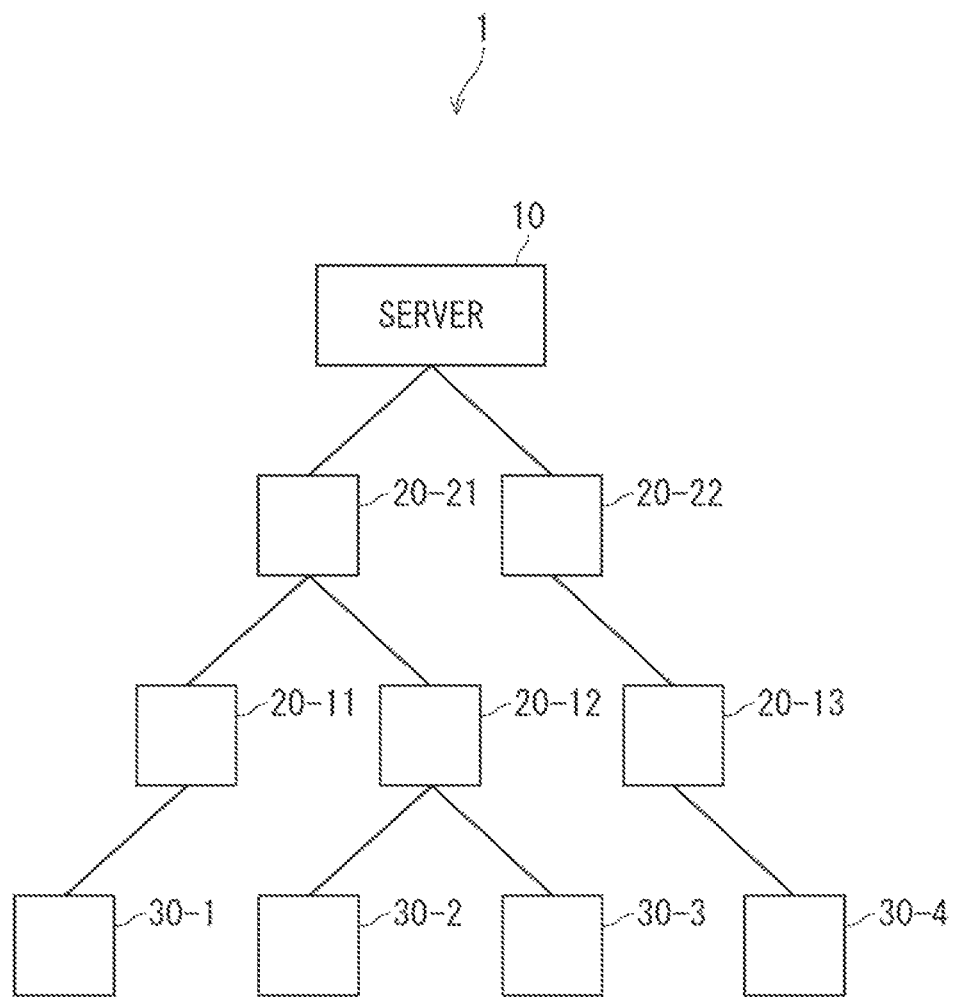
FIG. 1 is a diagram showing one example of an information collection system according to a first example embodiment.

FIG. 1 is a diagram showing one example of an information collection system according to a first example embodiment. In FIG. 1, an information collection system 1 includes a server 10, edge equipment 20-11, 20-12, and 20-13, edge equipment 20-21 and 20-22, and devices 30-1, 30-2, 30-3, and 30-4. In the following description, the edge equipment 20-11, 20-12, and 20-13 may each be simply referred to as an edge equipment 20-1 when it is not necessary to differentiate them. Further, the edge equipment 20-21 and 20-22 may each be simply referred to as an edge equipment 20-2 when it is not necessary to differentiate them. The edge equipment 20-1 may be referred to as a "first hierarchical edge equipment" and the edge equipment 20-2 may be referred to as a "second hierarchical edge equipment". Further, when the edge equipment 20-1 and the edge equipment 20-2 may each be simply referred to as an edge equipment 20 when it is not necessary to differentiate them. Further, the devices 30-1, 30-2, 30-3, and 30-4 may each be simply referred to as a device 30 when it is not necessary to differentiate them. While three edge equipment 20-1, two edge equipment 20-2, and four devices 30 are provided in FIG. 1, the numbers thereof are not limited thereto.

The edge equipment 20-1 is directly connected to the device 30. That is, the edge equipment 20-1 is an edge equipment in the first hierarchy when it is seen from the device 30.

The edge equipment 20-2 is connected to the device 30 via the edge equipment 20-1. That is, the edge equipment 20-2 is an edge equipment in the second hierarchy when it is seen from the device 30.

Further, the edge equipment 20-2 is directly connected to the server 10. That is, the edge equipment 20-2 is in the highest hierarchy. That is, the edge equipment 20-1 is in a lower layer when it is seen from the edge equipment 20-2. While the number of hierarchy levels of the edge equipment is two in this example, the number thereof is not limited to two and may be three or more.

The device 30, which may be a sensor, a camera, an Internet of Things (IoT) device or the like, acquires various kinds of data.

The server 10 acquires, for example, "processed data", which is data obtained by performing processing on data obtained in the device 30-1 in the edge equipment 20-11 and the edge equipment 20-21 in stages. Further, the server 10 acquires, along with this processed data, a "Bloom filter" in accordance with a "process pattern" executed on this processed data. The "process pattern" is "A-B" when, for example, a processing program A is executed in the edge equipment 20-11 and a processing program B is executed in the edge equipment 20-21. That is, the "process pattern" corresponds to an "execution sequence" regarding the processing program executed on a "route" that includes one or more pieces of edge equipment 20 from the device 30 to the server 10. Then the server 10 specifies, based on the acquired Bloom filter, the process pattern executed on the processed data that has been acquired.

<Configuration Example of Server>

Figure 2:
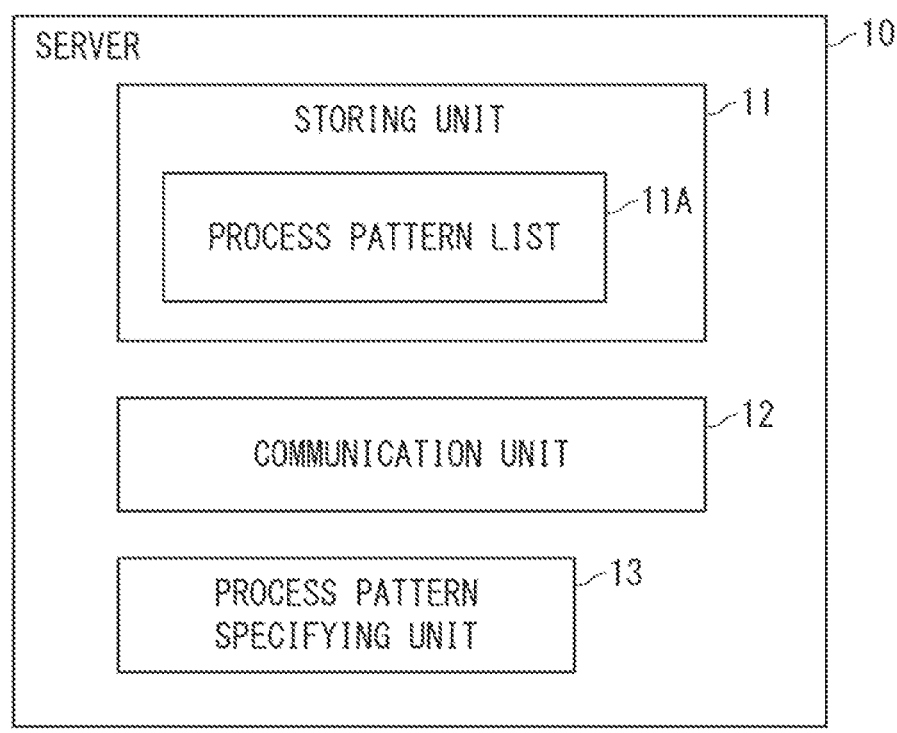
FIG. 2 is a block diagram showing one example of a server according to the first example embodiment.

FIG. 2 is a block diagram showing one example of the server according to the first example embodiment. In FIG. 2, the server 10 includes a storing unit 11, a communication unit 12, and a process pattern specifying unit 13.

The storing unit 11 stores the "process pattern list". The "process pattern list" holds a plurality of process patterns associated with "management Bloom filters" in accordance with the respective process patterns. The "process pattern list" holds all the process patterns in the information collection system 1. The "management Bloom filter" is a Bloom filter that is formed based on a hash value calculated using a "hash function group" including one or more hash functions for each processing program included in the corresponding process pattern.

The communication unit 12 receives a signal including the processed data and the Bloom filter in accordance with the process pattern executed on the processed data transmitted from the edge equipment 20-2 directly connected to the server 10.

The process pattern specifying unit 13 specifies the process pattern executed on the processed data received by the communication unit 12 based on the "process pattern list" and the Bloom filter received in the communication unit 12.

<Configuration Example of First Hierarchical Edge Equipment>

Figure 3:
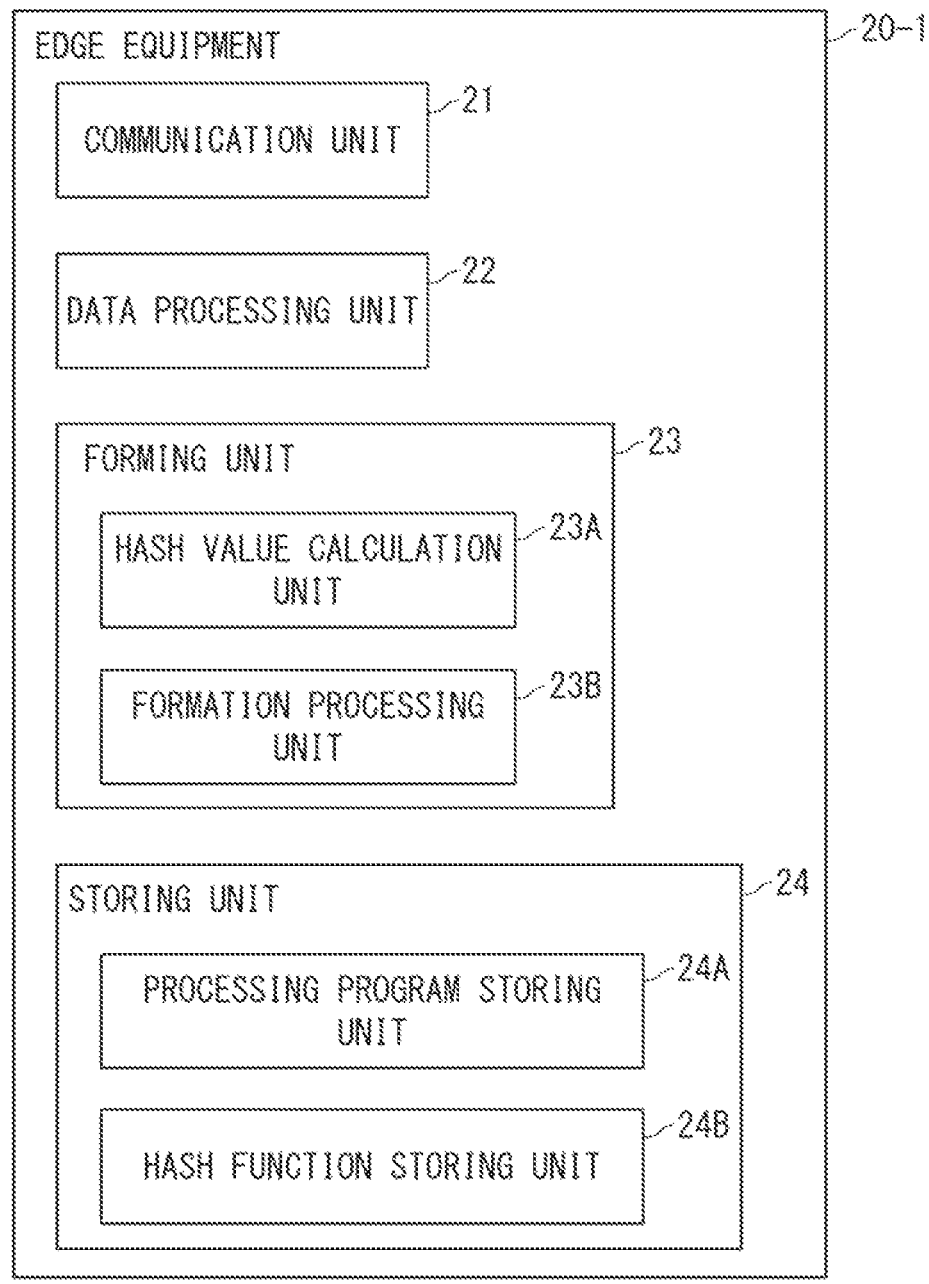
FIG. 3 is a block diagram showing one example of a first hierarchical edge equipment according to the first example embodiment.

FIG. 3 is a block diagram showing one example of the first hierarchical edge equipment according to the first example embodiment. In FIG. 3, the edge equipment 20-1 includes a communication unit 21, a data processing unit 22, a forming unit 23, and a storing unit 24.

The communication unit 21 receives data from the device 30. Further, the communication unit 21 forms a transmission signal including the processed data obtained in the data processing unit 22 and the Bloom filter obtained in the forming unit 23 (hereinafter this filter may be referred to as a "first Bloom filter") and transmits the transmission signal to the edge equipment 20-2.

The data processing unit 22 executes processing on the data received from the device 30 using the processing program stored in the storing unit 24, thereby obtaining the processed data. Note that this processing may include a plurality of types of processing that correspond to a plurality of processing programs.

The forming unit 23 includes a hash value calculation unit 23A and a formation processing unit 23B.

The hash value calculation unit 23A calculates a hash value of the processing program using the above processing program stored in the storing unit 24 and the "hash function group". The "hash function group" includes one or more hash functions.

The formation processing unit 23B forms the "first Bloom filter" using the hash value calculated in the hash value calculation unit 23A. The formation processing unit 23B sets, for example, the value of a bit that corresponds to the calculated hash value to "1" in a bit string composed of a predetermined number of bits, each having a bit value "0", thereby forming the "first Bloom filter".

The storing unit 24 includes a processing program storing unit 24A and a hash function storing unit 24B. The processing program storing unit 24A holds a processing program used in the data processing unit 22. The hash function storing unit 24B holds a hash function group used in the hash value calculation unit 23A.

<Configuration Example of Second Hierarchical Edge Equipment>

Figure 4:
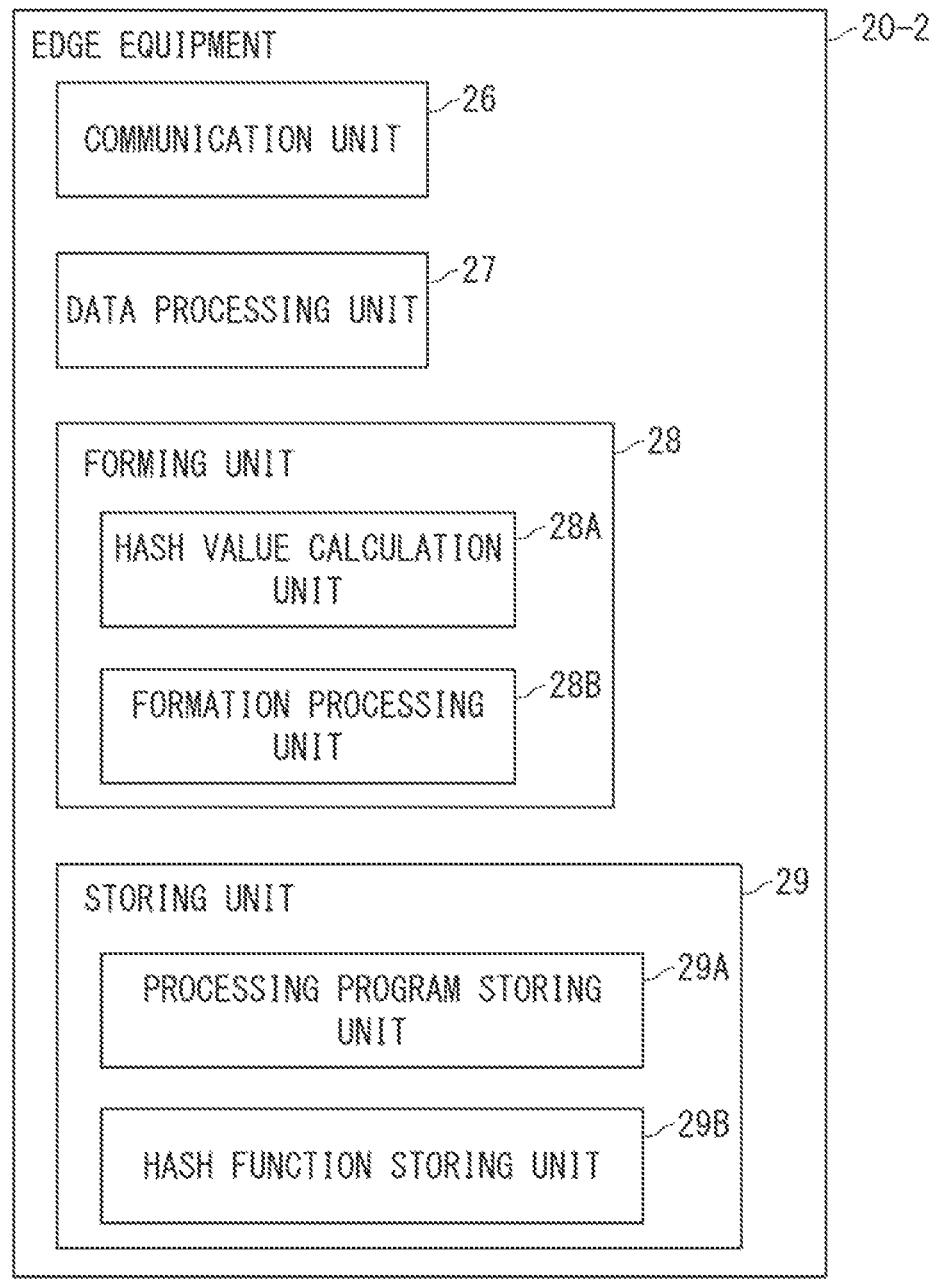
FIG. 4 is a block diagram showing one example of a second hierarchical edge equipment according to the first example embodiment.

FIG. 4 is a block diagram showing one example of the second hierarchical edge equipment according to the first example embodiment. The basic configuration of the edge equipment 20-2 shown in FIG. 4 is the same as the configuration of the edge equipment 20-1. In FIG. 4, the edge equipment 20-2 includes a communication unit 26, a data processing unit 27, a forming unit 28, and a storing unit 29.

The communication unit 26 receives a signal including data (i.e., processed data obtained in the edge equipment 20-1) and the first Bloom filter transmitted from the edge equipment 20-1. Further, the communication unit 26 forms a transmission signal including the processed data obtained in the data processing unit 27 and the Bloom filter obtained in the forming unit 28 (hereinafter this filter may be referred to as a "third Bloom filter") and transmits the transmission signal to the server 10.

The data processing unit 27 executes processing on the data received from the edge equipment 20-1 using the processing program stored in the storing unit 29, thereby obtaining the processed data. This processing may include a plurality of types of processing that correspond to a plurality of processing programs.

The forming unit 28 includes a hash value calculation unit 28A and a formation processing unit 28B.

The hash value calculation unit 28A calculates a hash value of the processing program using the above processing program and the "hash function group" stored in the storing unit 29. The "hash function group" includes one or more hash functions. This hash function group is the same as the hash function group of the edge equipment 20-1.

The formation processing unit 28B updates the above first Bloom filter using the hash value calculated in the hash value calculation unit 28A, thereby forming the third Bloom filter.

The formation processing unit 28B forms, for example, a "second Bloom filter" using the hash value calculated in the hash value calculation unit 28A. The formation processing unit 28B sets, for example, the value of a bit that corresponds to the hash value calculated by the hash value calculation unit 28A to "1" in a bit string composed of a predetermined number of bits, each having a bit value "0", thereby forming the "second Bloom filter".

Then the formation processing unit 28B calculates a logical sum of the above second Bloom filter and the above first Bloom filter, thereby forming the third Bloom filter.

The storing unit 29 includes a processing program storing unit 29A and a hash function storing unit 29B. The processing program storing unit 29A holds a processing program used in the data processing unit 27. The hash function storing unit 29B holds a hash function group used in the hash value calculation unit 28A.

As described above, according to the first example embodiment, in the server 10, the communication unit 12 receives the signal including the processed data and the Bloom filter in accordance with the process pattern executed on this processed data transmitted from the edge equipment 20-2 directly connected to the server 10. The process pattern specifying unit 13 specifies a process pattern executed on the processed data received in the communication unit 12 based on the "process pattern list" and the Bloom filter received in the communication unit 12.

According to the configuration of the server 10, it is possible to specify the process pattern executed on the processed data.

Further, in the edge equipment 20-2, the forming unit 28 forms the second Bloom filter based on the hash value calculated using the processing program executed in the edge equipment 20-2 and the hash function group. Then the forming unit 28 calculates a logical sum of the formed second Bloom filter and the first Bloom filter received from the edge equipment 20-1, thereby forming the third Bloom filter. The communication unit 26 forms a transmission signal including the processed data obtained in the data processing unit 27 and the third Bloom filter obtained in the forming unit 28 and transmits the transmission signal to the server 10.

With the configuration of the edge equipment 20-2, it is possible to specify the process pattern executed on the processed data in the server 10.

Second Example Embodiment

A second example embodiment relates to an embodiment for specifying a process pattern based on a Bloom filter and schema information. Since the configurations of an information collection system, a server, and an edge equipment according to the second example embodiment are the same as those of the information collection system 1, the server 10, and the edge equipment 20-1 and 20-2 according to the first example embodiment, descriptions will be given with reference to FIGS. 1-4.

The storing unit 11 of the server 10 according to the second example embodiment stores the "process pattern list". This process pattern list holds a plurality of process patterns associated with management Bloom filters and "schema information" in accordance with the respective process patterns. The "schema information" is a pattern of a schema obtained by a processing program that is executed last in the corresponding process pattern.

The process pattern specifying unit 13 of the server 10 according to the second example embodiment specifies the process pattern associated with the management Bloom filter and the schema information that match the Bloom filter received in the communication unit 12 and the schema of the processed data received in the communication unit 12 in the "process pattern list" as the process pattern executed on the processed data. The processed data received in the communication unit 12 includes an "output data schema" of the processing program executed in the edge equipment 20-2.

With the above configuration of the server 10, the process pattern executed on the processed data is specified using the Bloom filter and the schema, whereby it is possible to specify the process pattern more accurately. That is, although there is a problem of "false positive" in the Bloom filter, it becomes possible to differentiate process patterns by using the schema in addition to the Bloom filter. While the problem of false positive is reduced by elongating the length of the bit string of the Bloom filter, the data size of the Bloom filter ends up being increased. On the other hand, by using the schema in addition to the Bloom filter, the accuracy of specifying the process pattern can be maintained even when the data size of the Bloom filter is reduced. Further, since the data size of the Bloom filter can be reduced, it is possible to reduce the amount of transmission in the information processing system.

Third Example Embodiment

A third example embodiment relates to a method of forming the process pattern list according to the second example embodiment. Since the configurations of an information collection system and an edge equipment according to the third example embodiment are the same as those of the second example embodiment, descriptions thereof will be given with reference to FIGS. 1, 3, and 4. That is, an information collection system 1 according to the third example embodiment includes a server 50 that will be described later in place of the server 10.

<Configuration Example of Server>

Figure 5:
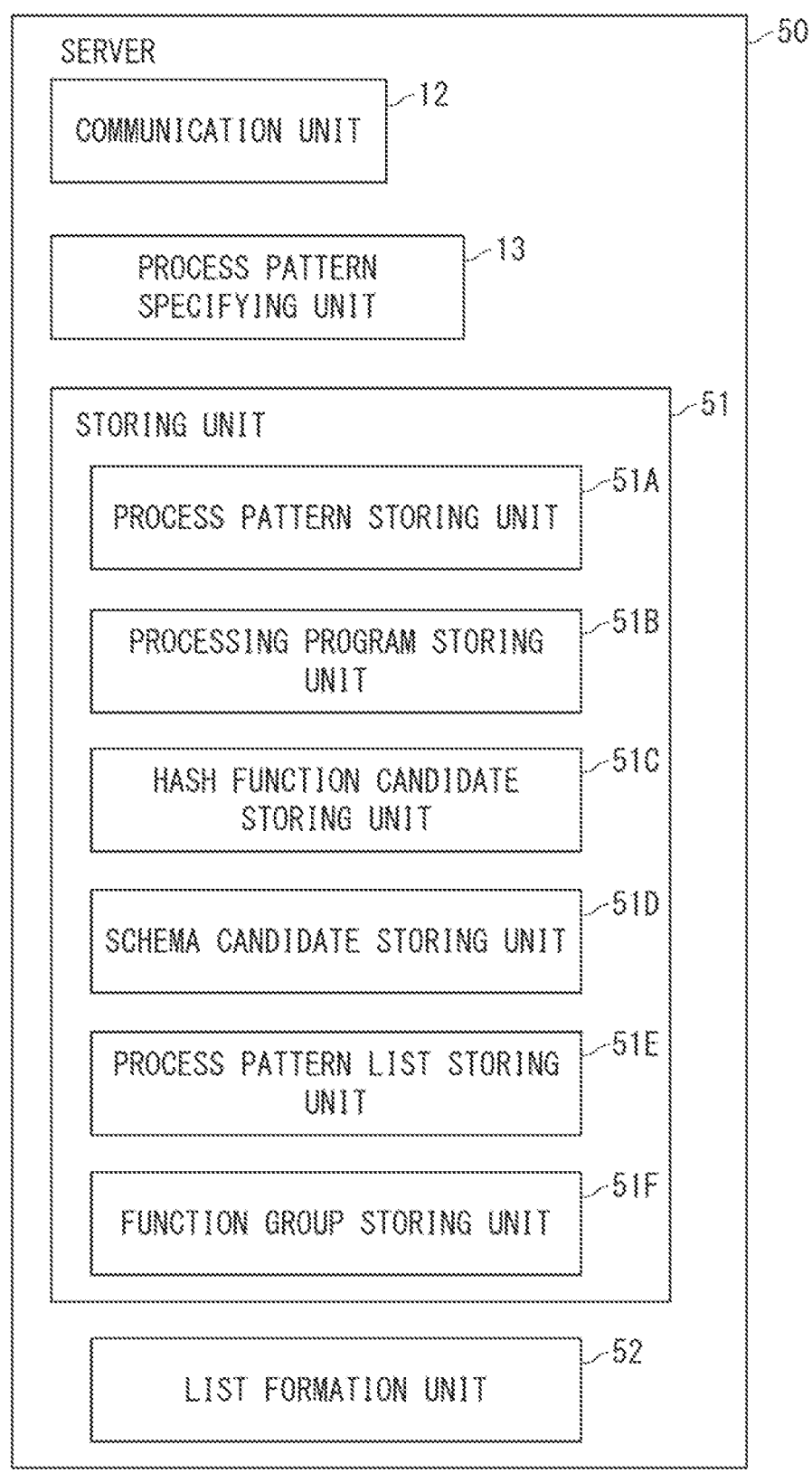
FIG. 5 is a block diagram showing one example of a server according to a third example embodiment.

FIG. 5 is a block diagram showing one example of the server according to the third example embodiment. In FIG. 5, the server 50 includes a communication unit 12, a process pattern specifying unit 13, a storing unit 51, and a list formation unit 52.

The storing unit 51 includes a process pattern storing unit 51A, a processing program storing unit 51B, a hash function candidate storing unit 51C, a schema candidate storing unit 51D, a process pattern list storing unit 51E, and a function group storing unit 51F.

The process pattern storing unit 51A stores a pattern candidate list that holds all the process pattern candidates in the information collection system 1. FIG. 6 is a diagram showing one example of the pattern candidate list according to the third example embodiment. The pattern candidate list shown in FIG. 6 holds five process pattern candidates. For example, the process pattern candidate (1) is "A-B-C", which indicates that the processing programs A, B, and C are executed in this order.

The processing program storing unit 51B stores all the processing programs executed in the edge equipment 20 included in the information collection system 1.

The hash function candidate storing unit 51C stores a plurality of hash function candidates (i.e., "a population of hash functions") used to select a hash function group.

The schema candidate storing unit 51D stores "output data schemas" of the respective processing programs executed in the edge equipment 20 included in the information collection system 1.

The process pattern list storing unit 51E stores the process pattern list formed in the list formation unit 52.

The function group storing unit 51F stores the hash function group specified in the list formation unit 52.

The list formation unit 52 specifies a "hash function group" with which it is possible to obtain a plurality of combinations of the management Bloom filter and the schema information, the plurality of combinations corresponding to the plurality of respective process patterns and being different from one another. Then the list formation unit 52 forms the process pattern list in which the management Bloom filter and the schema information obtained using the specified hash function group are associated with the process pattern. The specification of the hash function group and the formation of the process pattern list will be described in further detail.

The list formation unit 52 stores the specified "hash function group" in the function group storing unit 51F and transmits the specified "hash function group" to the edge equipment 20 via the communication unit 12. Accordingly, the edge equipment 20 receives and stores the hash function group.

<Operation Example of Server>

Figure 7:
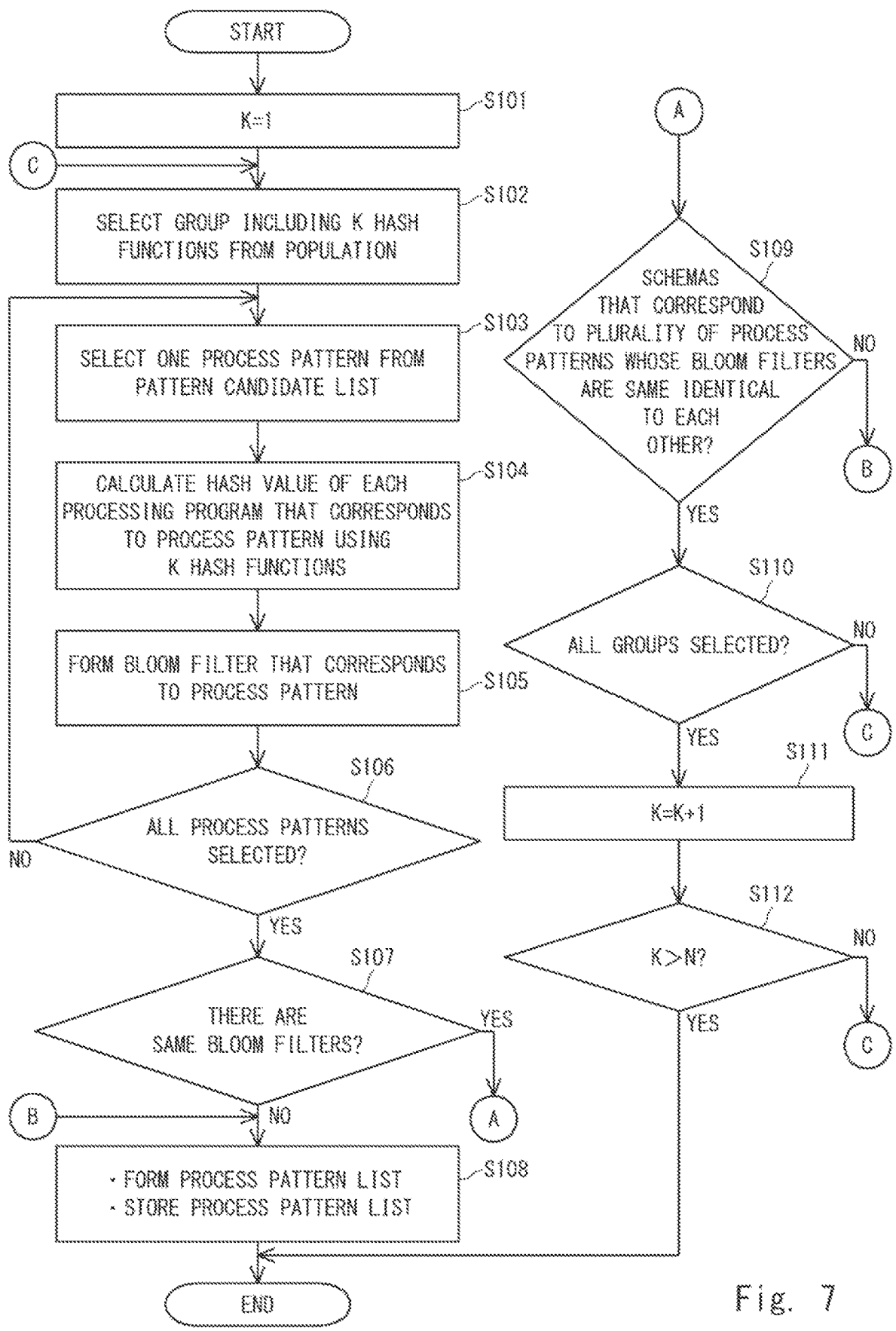
FIG. 7 is a flowchart showing one example of a process operation in a server according to the third example embodiment.

One example of a process operation of the server 50 having the aforementioned configuration will be described. FIG. 7 is a flowchart showing one example of the process operation of the server according to the third example embodiment. In this example, the formation of the process pattern list will be described.

The list formation unit 52 sets the number of hash functions to be selected K to be 1 (Step S101) and selects the K hash functions from the hash function population of the hash function candidate storing unit 51C (Step S102).

The list formation unit 52 selects one process pattern from the pattern candidate list of the process pattern storing unit 51A (Step S103).

The list formation unit 52 acquires each processing program that corresponds to the process pattern selected in Step S103 from the processing program storing unit 51B and calculates the hash value of each processing program using each of K hash functions (Step S104).

The list formation unit 52 forms the Bloom filter that corresponds to the process pattern selected in Step S103 using the hash value calculated in Step S104 (Step S105).

The list formation unit 52 determines whether or not all the process patterns have been selected (Step S106) and when there is a process pattern that has not yet been selected (Step S106: NO), the process step returns to Step S103. The process pattern that has not yet been selected is thus selected. That is, Steps S103-S105 are repeated until all the process patterns are selected.

When all the process patterns have been selected (Step S106: YES), the list formation unit 52 determines whether or not there are Bloom filters that are the same in the plurality of Bloom filters formed by repeating Steps S103-S105 (Step S107).

When there are no Bloom filters that are the same (Step S107: NO), the list formation unit 52 forms the process pattern list using the plurality of Bloom filters formed by repeating Steps S103-S105 (Step S108). Then the list formation unit 52 stores the formed process pattern list in the process pattern list storing unit 51E (Step S108). Further, the list formation unit 52 may store the group that has been selected last in Step S102 in the function group storing unit 51F. Further, the list formation unit 52 transmits the group that has been selected last in Step S102 to the edge equipment 20 via the communication unit 12.

When there are Bloom filters that are the same (Step S107: YES), the list formation unit 52 determines whether the schemas that correspond to the plurality of process patterns whose Bloom filters are the same are identical to each other (Step S109). The list formation unit 52 acquires, for example, schemas of the processing programs executed last of the plurality of respective process patterns whose Bloom filters are the same from the schema candidate storing unit 51D and compares the plurality of schemas that have been acquired.

When the schemas are not the same (Step S109: NO), the process step returns to Step S108. That is, the list formation unit 52 forms a process pattern list in which the plurality of process patterns are associated with the respective Bloom filters and the schemas in accordance with the respective process patterns and stores the process pattern list in the process pattern list storing unit 51E.

When the schemas are the same (Step S109), the list formation unit 52 determines whether or not all the groups have been selected (Step S110). When there is a group that has not yet been selected (Step S110: NO), the process step returns to Step S102. The group that has not yet been selected is thus selected from the population.

When all the groups have been selected (Step S110: YES), the list formation unit 52 increments K (Step S11) and determines whether K has exceeded N (Step S112). The symbol N is the number of hash functions included in the hash function population.

When K is equal to or smaller than N (Step S112: NO), the process step returns to Step S102. When K exceeds N (Step S112: YES), the flow shown in FIG. 7 is ended.

Next, one example of the process operation of the server 50 will be described with a specific example. It is assumed here that the pattern candidate list shown in FIG. 6 is used. It is further assumed that K=2.

As shown in FIG. 8, the list formation unit 52 calculates the hash value of each processing program using the first hash function and the second hash function. That is, the hash value calculated using the first hash function is a "hash value 1" and the hash value calculated using the second hash function is a "hash value 2". FIG. 8 is a diagram for explaining calculation of the hash values.

As shown in FIG. 9, the list formation unit 52 forms Bloom filters of the respective process patterns using the hash values 1 and 2 calculated for the respective processing programs. FIG. 9 is a diagram for explaining formation of the Bloom filters.

In FIG. 9, the Bloom filter of the process pattern (2) is the same as the Bloom filter of the process pattern (5). Therefore, the list formation unit 52 acquires the schema of the process pattern (2) (i.e., the schema of a processing program D that is executed last) and the schema of the process pattern (5) (i.e., the schema of a processing program E that is executed last) from the schema candidate storing unit 51D (see FIG. 10) and compares them. FIG. 10 is a diagram showing one example of the schema candidate table stored in the schema candidate storing unit. As shown in FIG. 10, the schema of the process pattern (2) (the schema of the processing program D) and the schema of the process pattern (5) (the schema of the processing program E) are different from each other.

Then the list formation unit 52 creates a process pattern list, as shown in FIG. 11. FIG. 11 is a diagram showing one example of the process pattern list. While the schema information is associated only with the process patterns (2) and (5) whose Bloom filters are the same in FIG. 11, it is merely one example and the schema information may be associated with each of the process patterns.

Figure 12:
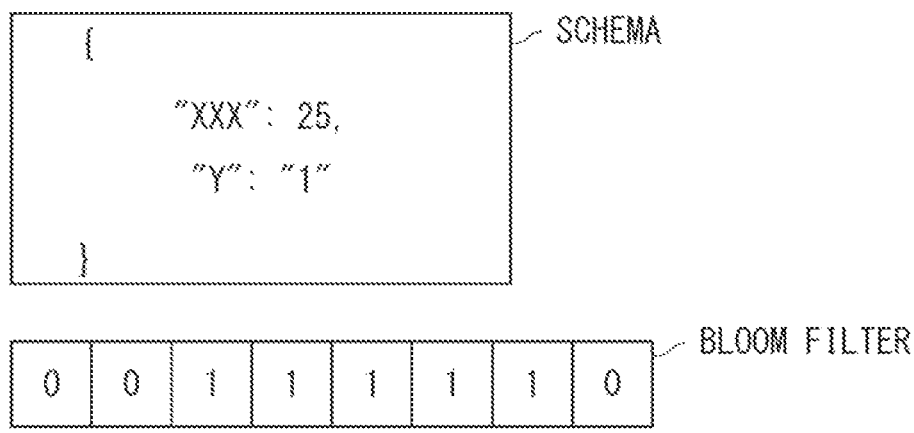
FIG. 12 is a diagram showing one example of a schema and a Bloom filter included in a reception signal.

The process pattern specifying unit 13 specifies the process pattern executed on the processed data using the above process pattern list. When, for example, a signal including the data (processed data) including the schema and the Bloom filter shown in FIG. 12 has been received in the communication unit 12, the process pattern specifying unit 13 specifies the process pattern (2) as a process pattern executed on the processed data. FIG. 12 is a diagram showing one example of the schema and the Bloom filter included in the reception signal.

Other Example Embodiments

<1> While the versions of the processing programs are not specifically described in the first to third example embodiments, if the versions of the processing programs are different from each other, they may be treated as process patterns different from each other. That is, when a version V1 and a version V2 are present in the processing program A, a process pattern "$A_{V1}$-B-C" and a process pattern "$A_{V2}$-B-C" may be treated as process patterns different from each other.

<2> When the process pattern executed on the processed data cannot be specified, the process pattern specifying unit 13 according to the first to third example embodiments may specify the processed data as "improper data".

Figure 13:
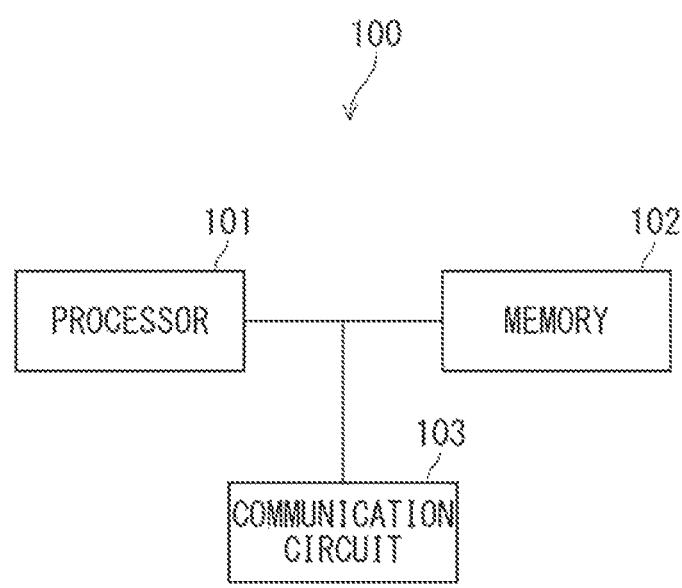
FIG. 13 is a diagram showing a hardware configuration example of the server.

<3> FIG. 13 is a diagram showing a hardware configuration example of the server. In FIG. 13, a server 100 includes a processor 101, a memory 102, and a communication circuit 103. The processor 101 may be, for example, a microprocessor, a Micro Processing Unit (MPU), or a Central Processing Unit (CPU). The processor 101 may include a plurality of processors. The memory 102 is composed of a combination of a volatile memory and a non-volatile memory. The memory 102 may include a storage located apart from the processor 101. In this case, the processor 101 may access the memory 102 via an I/O interface (not shown).

The servers 10 and 50 according to the first to third example embodiments may each have a hardware configuration shown in FIG. 13. The process pattern specifying unit 13 and the list formation unit 52 of the servers 10 and 50 according to the first to third example embodiments may be achieved by the processor 101 loading the program stored in the memory 102 and executing the loaded program. The storing units 11 and 51 may be achieved by the memory 102. The communication unit 12 may be achieved by the communication circuit 103. The program can be stored using various types of non-transitory computer readable media and provided to the servers 10 and 50. Examples of the non-transitory computer readable media include magnetic storage media (e.g., flexible disks, magnetic tapes, hard disk drives, etc.) and optical magnetic storage media (e.g., magneto-optical disks). Further, examples of the non-transitory computer readable media include CD-Read Only Memory (ROM), CD-R, and CD-R/W. Further, examples of the non-transitory computer readable media include semiconductor memories. The semiconductor memories include, for example, mask ROM, Programmable ROM (PROM), Erasable PROM (EPROM), flash ROM, and Random Access Memory (RAM). Further, the program may be supplied to the servers 10 and 50 by various types of transitory computer readable media. Examples of transitory computer readable media include electric signals, optical signals, and electromagnetic waves. Transitory computer readable media can provide the program to the servers 10 and 50 via a wired communication line (e.g., electric wires, and optical fibers) or a wireless communication line.

Figure 14:
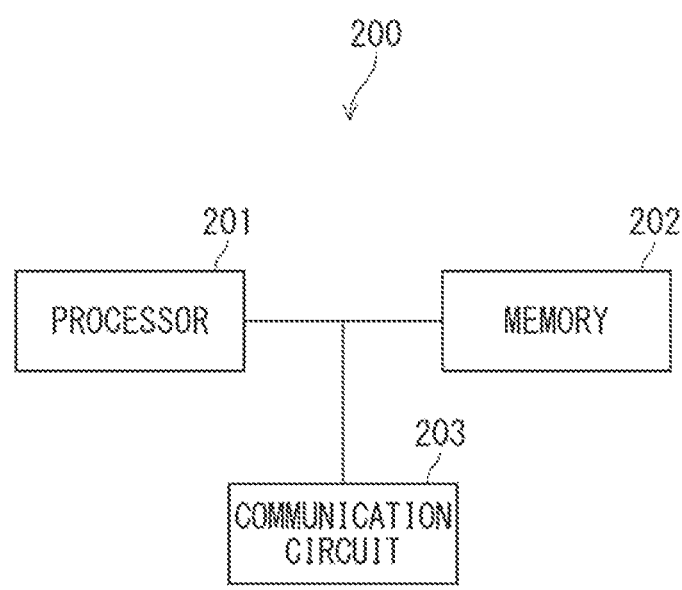
FIG. 14 is a diagram showing a hardware configuration example of edge equipment.

FIG. 14 is a diagram showing a hardware configuration example of the edge equipment. In FIG. 14, an edge equipment 200 includes a processor 201, a memory 202, and a communication circuit 203. The processor 201 may be, for example, a microprocessor, a Micro Processing Unit (MPU), or a Central Processing Unit (CPU). The processor 201 may include a plurality of processors. The memory 202 is composed of a combination of a volatile memory and a non-volatile memory. The memory 202 may include a storage located apart from the processor 201. In this case, the processor 201 may access the memory 202 via an I/O interface (not shown).

The edge equipment 20-1 and 20-2 according to the first to third example embodiments may each have the hardware configuration shown in FIG. 14. The data processing units 22 and 27 and the forming units 23 and 28 of the edge equipment 20-1 and 20-2 according to the first to third example embodiments may be achieved by the processor 201 loading the program stored in the memory 202 and executing the loaded program. The storing units 24 and 29 may be achieved by the memory 202. The communication units 21 and 26 may be achieved by the communication circuit 203. The program can be stored using various types of non-transitory computer readable media and provided to the edge equipment 20-1 and 20-2. Examples of the non-transitory computer readable media include magnetic storage media (e.g., flexible disks, magnetic tapes, hard disk drives, etc.) and optical magnetic storage media (e.g., magneto-optical disks). Further, examples of the non-transitory computer readable media include CD-Read Only Memory (ROM), CD-R, and CD-R/W. Further, examples of the non-transitory computer readable media include semiconductor memories. The semiconductor memories include, for example, mask ROM, Programmable ROM (PROM), Erasable PROM (EPROM), flash ROM, and Random Access Memory (RAM). Further, the program may be supplied to the edge equipment 20-1 and 20-2 by various types of transitory computer readable media. Examples of transitory computer readable media include electric signals, optical signals, and electromagnetic waves. Transitory computer readable media can provide the program to the edge equipment 20-1 and 20-2 via a wired communication line (e.g., electric wires, and optical fibers) or a wireless communication line.

According to this disclosure, it is possible to provide a server apparatus, an edge equipment, a process pattern specifying method, and a control program capable of specifying a process pattern executed on a processed data.

The first to third embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A server apparatus included in an information collection system that collects data in the server apparatus from each of a plurality of devices via a plurality of pieces of edge equipment that are hierarchized, the server apparatus comprising:

hardware, including a processor, a memory and a communication circuit;

a storing unit that is implemented at least by the hardware and configured to store a process pattern list, the process pattern list holding a plurality of process patterns associated with management Bloom filters in accordance with the respective process patterns, each of the process patterns corresponding to an execution sequence of processing programs executed in one or more pieces of edge equipment on a route that includes the one or more pieces of edge equipment and reaches the server apparatus, and the management Bloom filter being a Bloom filter formed based on a hash value calculated using a hash function group including one or more hash functions for each processing program included in a corresponding process pattern;

a communication unit that is implemented at least by the hardware and configured to receive processed data and a Bloom filter in accordance with the process pattern executed on the processed data transmitted from one of the pieces of edge equipment directly connected to the server apparatus; and a process pattern specifying unit that is implemented at least by the hardware and configured to specify the process pattern executed on the processed data based on the process pattern list and the received Bloom filter.

2. The server apparatus according to claim 1, wherein the process pattern list holds each of a plurality of process patterns associated with management Bloom filters and schema information in accordance with the respective process patterns, the schema information is a pattern of a schema obtained by a processing program last executed in the corresponding process pattern, and the process pattern specifying unit specifies a process pattern that is associated with the management Bloom filter and the schema information that match the received Bloom filter and the schema of the received processed data in the process pattern list as the process pattern executed on the processed data.

3. The server apparatus according to claim 2, further comprising a list formation unit that is implemented at least by the hardware and configured to specify the hash function group with which it is possible to obtain a plurality of combinations of the management Bloom filter and the schema information, the plurality of combinations corresponding to the plurality of respective process patterns and being different from one another, and to form the process pattern list in which the management Bloom filter and the schema information obtained using the specified hash function group are associated with the process pattern.

4. The server apparatus according to claim 3, wherein the communication unit transmits the specified hash function group to the plurality of pieces of edge equipment.

5. The server apparatus according to claim 1, wherein the process pattern specifying unit specifies the processed data as improper data when a process pattern executed on the processed data cannot be specified.

6. The server apparatus according to claim 1, wherein
the plurality of process patterns include a first process pattern and a second process pattern,
the first process pattern comprises information regarding one processing program of a first version, and
the second process pattern comprises information regarding the one processing program of a second version that is different from the first version.

7. An edge equipment that is included in an information collection system for collecting data in a server apparatus via a plurality of pieces of edge equipment that are hierarchized from a device and transmits processed data obtained by performing processing on data received from the edge equipment in a lower layer to the server apparatus or the edge equipment in a higher layer, the edge equipment comprising:
hardware, including a processor, a memory and a communication circuit;
a communication unit that is implemented at least by the hardware and configured to receive a first Bloom filter along with the data from the edge equipment in the lower layer, the first Bloom filter being a Bloom filter formed based on a hash value calculated using a processing program executed on data in the edge equipment in the lower layer and a hash function group including one or more hash functions; and
a forming unit that is implemented at least by the hardware and configured to form a second Bloom filter based on a hash value calculated using a processing program executed on the received data in the edge equipment and the hash function group and form a third Bloom filter by calculating a logical sum of the formed second Bloom filter and the received first Bloom filter,
wherein the communication unit transmits the formed third Bloom filter to the server apparatus or the edge equipment in the higher layer along with the processed data.

8. The edge equipment according to claim 7, wherein the communication unit receives the hash function group from the server apparatus.

9. A process pattern specifying method by a server apparatus included in an information collection system that collects data in the server apparatus from each of a plurality of devices via a plurality of pieces of edge equipment that are hierarchized, wherein
the server apparatus comprises a storing unit configured to store a process pattern list, the process pattern list holding a plurality of process patterns associated with management Bloom filters in accordance with the respective process patterns, each of the process patterns corresponding to an execution sequence of processing programs executed in one or more pieces of edge equipment on a route that includes the one or more pieces of edge equipment and reaches the server apparatus, and the management Bloom filter being a Bloom filter formed based on a hash value calculated using a hash function group including one or more hash functions for each processing program included in a corresponding process pattern, and
the process pattern specifying method comprises:
receiving processed data and a Bloom filter in accordance with the process pattern executed on the processed data transmitted from one of the pieces of edge equipment directly connected to the server apparatus; and
specifying the process pattern executed on the processed data based on the process pattern list and the received Bloom filter.

* * * * *